(12) United States Patent
Kamiya

(10) Patent No.: US 10,560,640 B2
(45) Date of Patent: Feb. 11, 2020

(54) SIGNAL PROCESSING DEVICE, SIGNAL PROCESSING METHOD, AND CAMERA SYSTEM

(71) Applicant: SONY CORPORATION, Tokyo (JP)

(72) Inventor: Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/074,804

(22) PCT Filed: Feb. 27, 2017

(86) PCT No.: PCT/JP2017/007566
§ 371 (c)(1),
(2) Date: Aug. 2, 2018

(87) PCT Pub. No.: WO2017/150473
PCT Pub. Date: Sep. 8, 2017

(65) Prior Publication Data
US 2019/0045137 A1 Feb. 7, 2019

(30) Foreign Application Priority Data
Mar. 4, 2016 (JP) ................. 2016-042867

(51) Int. Cl.
*H04N 5/243* (2006.01)
*H04N 5/20* (2006.01)
(Continued)

(52) U.S. Cl.
CPC ............ *H04N 5/243* (2013.01); *G06T 5/009* (2013.01); *H04N 5/20* (2013.01); *H04N 5/2351* (2013.01); *H04N 5/2355* (2013.01); *H04N 5/265* (2013.01); *H04N 7/0117* (2013.01); *G06T 2207/20208* (2013.01)

(58) Field of Classification Search
CPC ...... H04N 5/20; H04N 5/202; H04N 5/23229; H04N 5/2351; H04N 5/2355; H04N 5/243; H04N 5/265; H04N 7/0117; G06T 5/009
See application file for complete search history.

(56) References Cited

U.S. PATENT DOCUMENTS

2004/0125220 A1    7/2004    Fukuda et al.
2010/0045824 A1    2/2010    Kido et al.
(Continued)

FOREIGN PATENT DOCUMENTS

JP    2004-208028 A    7/2004
JP    2005-86358 A    3/2005
(Continued)

OTHER PUBLICATIONS

Office Action dated Jul. 3, 2018 in corresponding Japanese Patent Application No. 2016-042867, 9 pages.
(Continued)

*Primary Examiner* — Daniel M Pasiewicz
(74) *Attorney, Agent, or Firm* — Oblon, McClelland, Maier & Neustadt, L.L.P.

(57) ABSTRACT

To enable to easily check a predetermined signal level region of an HDR video signal on an SDR screen displayed on an SDR-compliant display device.
Processing at least including gradation compression processing for SDR is performed on the HDR video signal to obtain a standard dynamic range video signal. A predetermined signal level region is detected from the HDR video signal. An SDR video signal for display is obtained by combining a display signal for displaying the predetermined signal level region with an SDR video signal on the basis of a signal indicating the predetermined signal level region.

8 Claims, 7 Drawing Sheets

(51) Int. Cl.
*H04N 5/235* (2006.01)
*G06T 5/00* (2006.01)
*H04N 5/265* (2006.01)
*H04N 7/01* (2006.01)

(56) References Cited

U.S. PATENT DOCUMENTS

| | | |
|---|---|---|
| 2015/0103919 A1 | 4/2015 | Hattori et al. |
| 2015/0117791 A1 | 4/2015 | Mertens |
| 2016/0080714 A1 | 3/2016 | Tsukagoshi |
| 2016/0112715 A1 | 4/2016 | Hattori et al. |
| 2016/0255360 A1 | 9/2016 | Hattori et al. |
| 2017/0208344 A1 | 7/2017 | Mertens |
| 2018/0160090 A1 | 6/2018 | Tsukagoshi |

FOREIGN PATENT DOCUMENTS

| | | |
|---|---|---|
| JP | 2008-60866 A | 3/2008 |
| JP | 2008-227787 | 9/2008 |
| JP | 2010-50737 A | 3/2010 |
| JP | 2012-44480 A | 3/2012 |
| JP | 2013-055567 | 3/2013 |
| JP | 2014-167609 | 9/2014 |
| WO | WO 2014/178286 A1 | 11/2014 |
| WO | 2015/198560 | 6/2015 |

OTHER PUBLICATIONS

Office Action dated Nov. 13, 2018 in corresponding Japanese Patent Application No. 2016-042867, 4 pages.
Extended European Search Report dated Jan. 29, 2019 in Patent Application No. 17759939.6, citing documents AA-AG, AO and therein, 10 pages.
Tim Borer, "Non-linear Opto-Electrical Transfer Functions for High Dynamic Range Television", BBC Research & Development White Paper WHP283, XP055275016, Jul. 1, 2014, pp. 1-20 and cover pages.
International Search Report issued May 23, 2017 in PCT/JP2017/007566.
Office Action issued Nov. 26, 2019 in Japanese Patent Application No. 2018-188642 (With English Translation), p. 1-16.

SIGNAL PROCESSING DEVICE, SIGNAL PROCESSING METHOD, AND CAMERA SYSTEM

TECHNICAL FIELD

The present technology relates to a signal processing device, a signal processing method, and a camera system, and specifically relates to a signal processing device and the like for determining a signal level of a high dynamic range video signal.

BACKGROUND ART

A video signal of a high dynamic range (HDR) has a luminance level range from 0% to 100%*N (N is a number larger than one) with respect to a video signal of a standard dynamic range (SDR) having a luminance level range of 0% to 100%. A camera which outputs an HDR video signal as a captured video signal is conventionally known (refer to, for example, Patent Document 1).

With the HDR video signal, it is difficult to correctly grasp a luminance level of each subject due to expansion in dynamic range. For example, even if the HDR video signal exceeding 1000% is displayed on a waveform monitor with a linear signal level, scale feeling of luminance is too wide to grasp a situation of the luminance level in a normal zone important as video, and on the other hand, in a case where a signal of a transmission format subjected to gradation compression processing by using an optical-electro transfer function (OETF) is displayed with a code as it is, a high luminance portion is compressed to be displayed on the contrary, so that it becomes difficult to grasp the correct luminance level.

Also, in a case of checking the luminance on a video monitor, since human vision has a logarithmic characteristic, for example, as compared to a difference in luminance change which may be recognized at 50% and 100% in the luminance level range of the SDR video signal, a difference in luminance change which may be recognized at 250% and 500% in the luminance level range of the HDR video signal is small and it is difficult to distinguish clearly.

Conventionally, it is suggested to detect a predetermined luminance level region from the SDR video signal, and combining a display signal for displaying the region with the SDR video signal to obtain an SDR video signal for display, thereby easily checking the predetermined luminance level region on a screen (refer to, for example, Patent Document 2).

CITATION LIST

Patent Document

Patent Document 1: Japanese Patent Application Laid-Open No. 2015-115789
Patent Document 2: Japanese Patent Application Laid-Open No. 2008-060866

SUMMARY OF THE INVENTION

Problems to be Solved by the Invention

An object of the present technology is to easily check a predetermined signal level region of an HDR video signal on a screen displayed on a display device.

Solutions to Problems

The concept of the present technology is
a signal processing device provided with:
a signal processing unit which obtains a standard dynamic range video signal by performing processing including at least gradation compression processing for a standard dynamic range on a high dynamic range video signal;
a level detection unit which detects a predetermined signal level region from the high dynamic range video signal; and
a combination unit which combines a display signal for displaying the predetermined signal level region with the standard dynamic range video signal on the basis of a signal indicating the predetermined signal level region detected from the high dynamic range video signal to obtain a standard dynamic range video signal for display.

In the present technology, the signal processing unit performs the processing at least including the gradation compression processing for the standard dynamic range on the high dynamic range video signal to obtain the standard dynamic range video signal.

The predetermined signal level region is detected from the high dynamic range video signal by the level detection unit. For example, the level detection unit may detect the predetermined signal level region from a luminance signal forming the high dynamic range video signal. Also, for example, the level detection unit may detect the predetermined signal level region from a primary color signal forming the high dynamic range video signal.

The combination unit combines the display signal for displaying the predetermined signal level region with the standard dynamic range video signal on the basis of the signal indicating the predetermined signal level region detected from the high dynamic range video signal to obtain the standard dynamic range video signal for display. For example, the display signal may be a signal displaying the predetermined signal level region in a specific color or a specific luminance pattern (zebra pattern, cross-hatched pattern and the like).

Meanwhile, in the present technology, for example, the high dynamic range video signal may have first resolution, a first resolution conversion unit which converts resolution of the dynamic range video signal from the first resolution to second resolution lower than the first resolution, and a second resolution conversion unit which converts resolution of the signal indicating the predetermined signal level region from the first resolution to the second resolution may further be provided, in which the signal processing unit may process the high dynamic range video signal converted to the second resolution to obtain the standard dynamic range video signal of the second resolution, and the combination unit may combine the display signal for displaying the predetermined signal level region with the standard dynamic range video signal of the second resolution on the basis of the signal indicating the predetermined signal level region converted to the second resolution to obtain the standard dynamic range video signal for display of the second resolution.

Also, in the present technology, for example, the combination unit may output the standard dynamic range video signal for display to a display device for displaying the predetermined signal level region.

Also, another concept of the present technology is
a camera system provided with:
an imaging unit which obtains a high dynamic range video signal;
a signal processing unit which obtains a standard dynamic range video signal by performing processing including at least gradation compression processing for a standard dynamic range on the high dynamic range video signal;

a level detection unit which detects a predetermined signal level region from the high dynamic range video signal; and a combination unit which combines a display signal for displaying the predetermined signal level region with the standard dynamic range video signal on the basis of a signal indicating the predetermined signal level region detected from the high dynamic range video signal to obtain a standard dynamic range video signal for display.

In the present technology, the high dynamic range video signal is obtained by the imaging unit. The signal processing unit performs the processing at least including the gradation compression processing for the standard dynamic range on the high dynamic range video signal to obtain the standard dynamic range video signal.

The predetermined signal level region is detected from the high dynamic range video signal by the level detection unit. Then, the combination unit combines the display signal for displaying the region for displaying the predetermined signal level region with the standard dynamic range video signal on the basis of the signal indicating the predetermined signal level region detected from the high dynamic range video signal, thereby obtaining the standard dynamic range video signal for display.

Effects of the Invention

According to the present technology, it is possible to easily check a predetermined signal level region of an HDR video signal on a screen displayed on a display device. Meanwhile, the effect described in this specification is illustrative only; the effect is not limited thereto and there may also be an additional effect.

BRIEF DESCRIPTION OF DRAWINGS

FIG. 4 is a view for illustrating an effect of detecting a predetermined signal level region from an HDR video signal, an effect of detecting a predetermined signal level region from a linear HDR video signal and the like.

MODE FOR CARRYING OUT THE INVENTION

A mode for carrying out the invention (hereinafter referred to as an "embodiment") is hereinafter described. Meanwhile, it is described in the following order.
1. First Embodiment
2. Second Embodiment
3. Variation 1. First Embodiment

[Configuration Example of Camera System]

Figure 1:
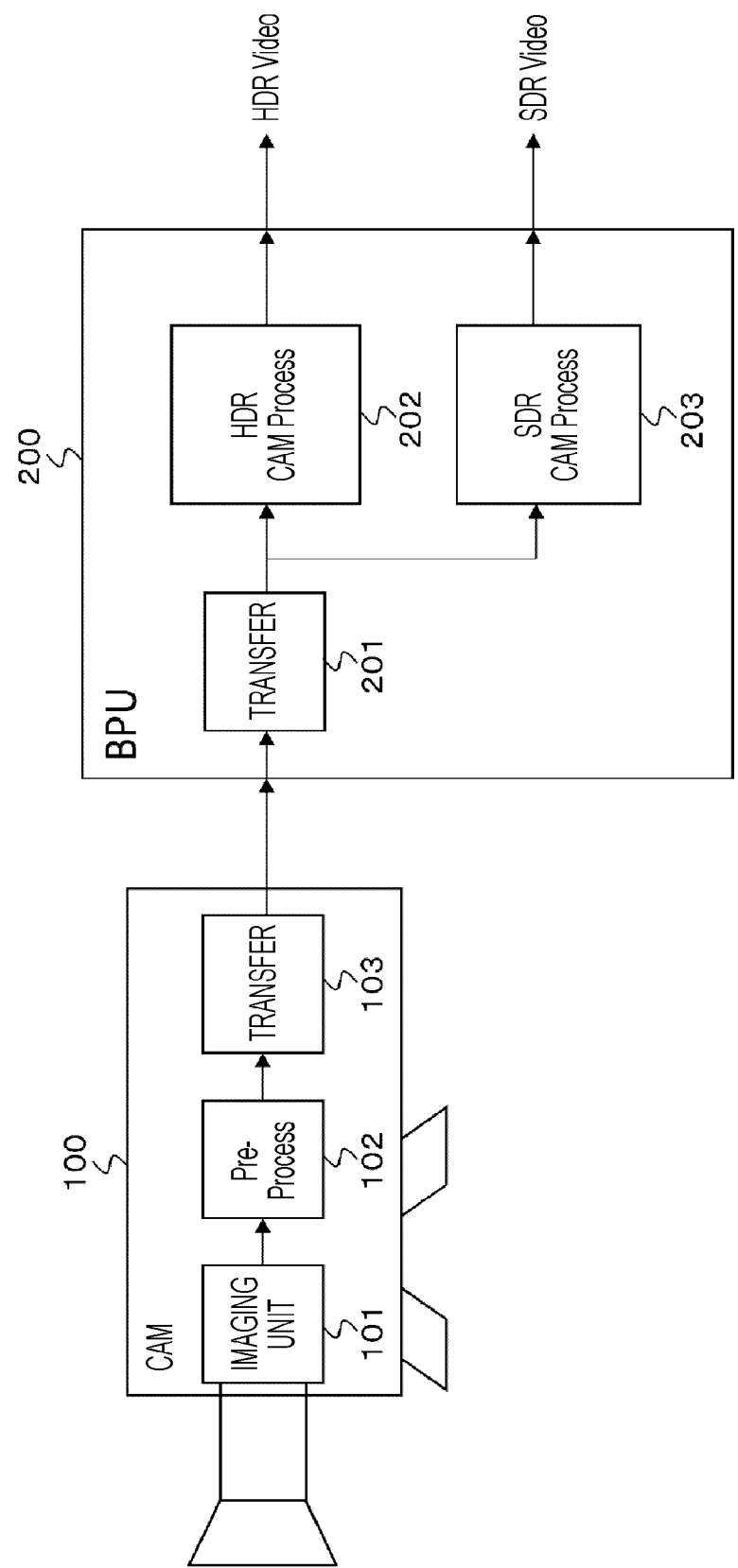
FIG. 1 is a block diagram illustrating a configuration example of a camera system as a first embodiment.

FIG. 1 illustrates a configuration example of a camera system 10 as an embodiment. The camera system 10 is configured such that a linear high dynamic range (HDR) video signal as a captured video signal obtained by a camera 100 is transmitted to a baseband processor unit (BPU) 200 as a signal processing unit. Herein, "linear" means that gradation compression processing is not performed.

The camera 100 includes an imaging unit 101, a pre-process unit 102, and a transmission unit 103. The imaging unit 101 includes, for example, an image sensor with UHD (8k, 4K and the like) or HD resolution, and outputs an HDR video signal as the captured video signal. The pre-process unit 102 is a processor including a circuit such as FPGA and ASIC, for example, and performs correction processing of an optical system such as a lens, correction processing of a damage caused by variation in image sensors and the like on the HDR video signal output from the imaging unit 101, and the like. The transmission unit 103 is a circuit including a communication interface and transmits the HDR video signal processed by the pre-process unit 102 to the BPU 200. Herein, the 4K resolution is resolution of about 4,000 horizontal pixels×about 2,000 vertical pixels, for example, 4096×2160 or 3840×2160, and the 8K resolution is resolution in which the vertical and horizontal pixels are twice as many as the pixels of the 4K resolution. Also, the HD resolution is, for example, resolution in which the vertical and horizontal pixels are half the pixels of the 4K resolution.

The BPU 200 includes a transmission unit 201, an HDR camera process (HDR CAM Process) unit 202, and an SDR camera process (SDR CAM Process) unit 203. The transmission unit 201 is a circuit including a communication interface and receives the linear HDR video signal transmitted from the camera 100. The HDR camera process unit 202 is a processor including a circuit such as FPGA and ASIC, for example, and performs processing such as color gamut conversion, detail (contour) correction, and gradation compression on the linear HDR video signal received by the transmission unit 201 to obtain an output HDR video signal (HDR Video). The gradation compression processing herein means the gradation compression processing of compressing a bit length from a linear region by using an optical-electro transfer function (OETF) for HDR. The SDR camera process unit 203 is a processor including a circuit such as FPGA and ASIC, for example, and performs processing such as color gamut conversion, knee correction, detail (contour) correction, and gradation compression on the linear HDR video signal received by the transmission unit 201 to obtain an output SDR video signal (SDR Video). The gradation compression processing herein means the gradation compression processing of compressing the bit length from the linear region by using an optical-electro transfer function (for example, a gamma characteristic) for SDR.

Figure 2:
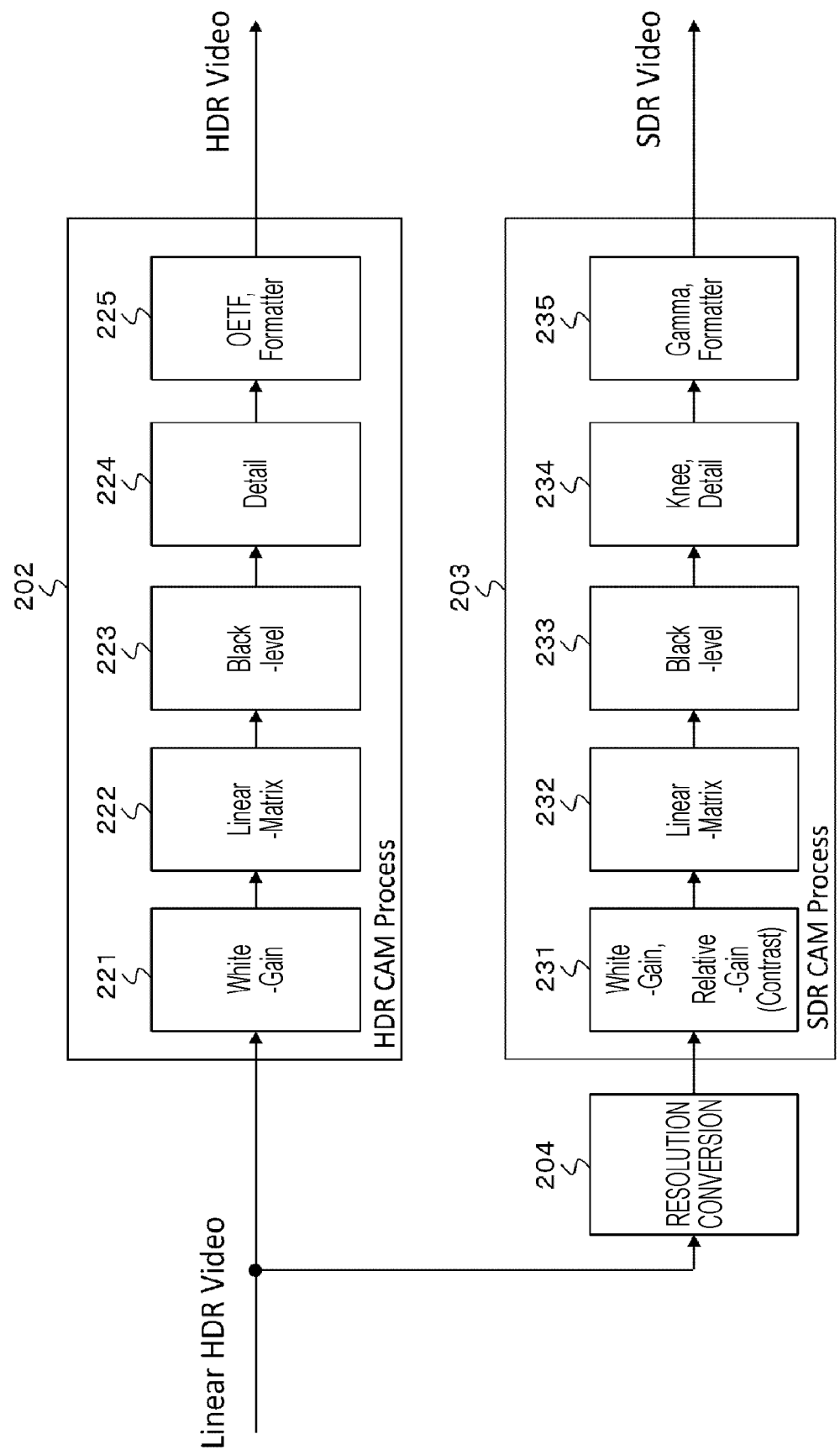
FIG. 2 is a block diagram illustrating a detailed configuration example of an HDR camera process unit and an SDR camera process unit.

FIG. 2 illustrates a detailed configuration example of the HDR camera process unit 202 and the SDR camera process unit 203. Meanwhile, this example is an example in which the linear HDR video signal has the UHD (8K, 4K and the like) resolution, and a resolution conversion unit 204 which converts the resolution of the linear HDR video signal from UHD to HD is provided on a preceding stage of the SDR camera process unit 203. The resolution conversion unit 204 is a processor including a circuit such as FPGA and ASIC, for example.

The HDR camera process unit 202 includes a white-gain unit 221, a linear-matrix unit 222, a black-level unit 223, a detail unit 224, and an optical-electro transfer function (OETF)/formatter unit 225.

The white-gain unit 221 adjusts gain of each of primary color signals of R, G, and B forming the linear HDR video signal (Linear HDR Video) received by the transmission unit 201 (refer to FIG. 1) for white balance adjustment. The linear-matrix unit 222 performs the color gamut conversion processing on the HDR video signal output from the white-gain unit 221. The black-level unit 223 adjusts a black level of the HDR video signal output from the linear-matrix unit 222.

The detail unit 224 performs the detail (contour) correction processing on the HDR video signal output from the black-level unit 223. The OETF/formatter unit 225 performs the gradation compression processing, that is, the gradation compression processing of compressing the bit length from the linear region by using the optical-electro transfer function for HDR on the HDR video signal output from the detail unit 224. Through the gradation compression processing, the HDR video signal is subjected to the gradation compression processing with a log curve characteristic. Herein, the log curve characteristic is intended to mean not only a logarithmic function itself but also a curve of a characteristic such that gradation of low band luminance is dense and gradation of high band luminance is sparse, and there are, for example, a hybrid log-gamma (HLG) curve characteristic, a perceptual quantizer (PQ) curve characteristic, an S-LOG 3 characteristic and the like. Also, the OETF/formatter unit 225 converts the HDR video signal subjected to the gradation compression in this manner from an RGB domain to a Y chrominance domain to obtain the output HDR video signal (HDR Video).

The SDR camera process unit 203 includes a white-gain/relative-gain unit 231, a linear-matrix unit 232, a black-level unit 233, a knee/detail unit 234, and a gamma/formatter unit 235.

The white-gain/relative-gain unit 231 adjusts gain of each of the primary color signals of R, G, and B forming the linear HDR video signal (Linear HDR Video) converted to the HD resolution by the resolution conversion unit 204 for white balance adjustment and contrast adjustment.

The linear-matrix unit 232 performs the color gamut conversion processing on the HDR video signal output from the white-gain/relative-gain unit 231. The black-level unit 233 adjusts a black level of the HDR video signal output from the linear-matrix unit 232. The knee/detail unit 234 performs the knee correction on the HDR video signal output from the black-level unit 233 to obtain an SDR video signal, and further performs the detail (contour) correction on the SDR video signal.

The gamma/formatter unit 235 performs the gradation compression processing of compressing the bit length from the linear region by using the optical-electro transfer function (gamma characteristic) for SDR on the linear SDR video signal output from the knee/detail unit 234. Also, the gamma/formatter unit 235 converts the SDR video signal subjected to the gradation compression in this manner from the RGB domain to the Y chrominance domain to obtain the output SDR video signal (SDR Video).

In this embodiment, the BPU 200 may detect a predetermined signal level region from a luminance signal in the HDR video signal, and combine a display signal for displaying the predetermined signal level region with the SDR video signal on the basis of a signal indicating the predetermined signal level region. By combining the display signal with the SDR video signal in this manner, it is possible to easily check the predetermined signal level region of the luminance signal in the HDR video signal on an SDR screen displayed on an SDR-compliant display device.

Figure 3:
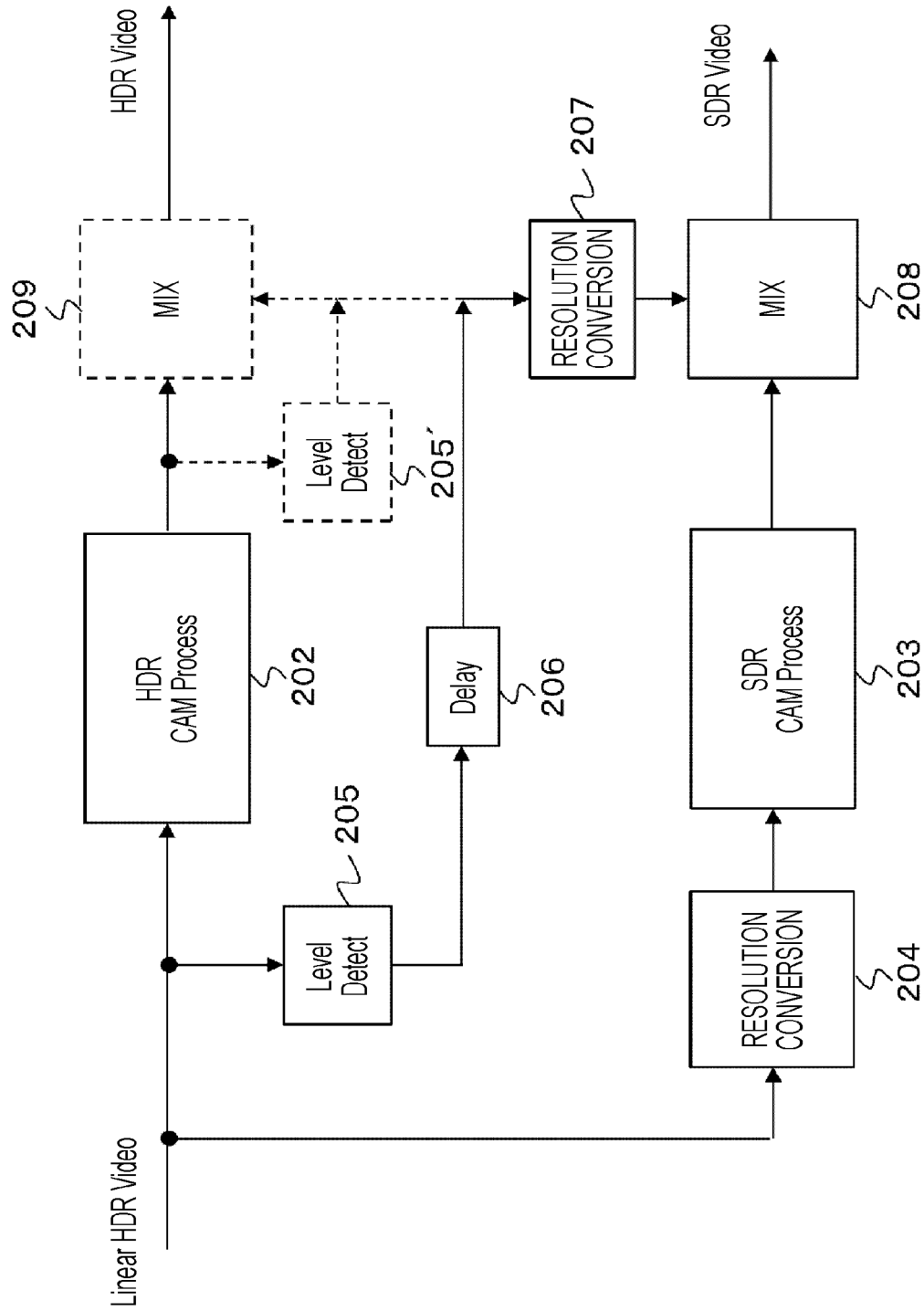
FIG. 3 is a block diagram illustrating a configuration example of a portion regarding generation and combination of a display signal in a BPU.

FIG. 3 illustrates a configuration example of a portion regarding generation and combination of the display signal in the BPU 200. In FIG. 3, parts corresponding to those in FIGS. 1 and 2 are assigned with the same reference signs. A level detection (Level Detect) unit 205 being a processor including a circuit such as FPGA and ASIC, for example, detects a predetermined signal level region from a luminance signal forming the linear HDR video signal (Linear HDR Video) received by the transmission unit 201 (refer to FIG. 1) and outputs a signal indicating the predetermined signal level region.

The signal indicating the predetermined signal level region is the signal which becomes "1" in a detection region and "0" in other regions corresponding to each pixel signal, for example, and has the same resolution as that of the HDR video signal, herein, the UHD (8K, 4K and the like) resolution. Meanwhile, the predetermined signal level may be specified by a user from, for example, a user operation unit not illustrated. For example, the signal level is specified as "A % to B %", "C % or higher" and the like.

A delay unit 206 being a processor including a circuit such as FPGA and ASIC, for example, is provided for aligning a timing of the signal indicating the predetermined signal level region obtained by the level detection unit 205 to that of the output SDR video signal (SDR Video) obtained by the SDR camera process unit 203. A resolution conversion unit 207 being a processor including a circuit such as FPGA and ASIC, for example, converts the resolution of the signal indicating the predetermined signal level region the timing of which is adjusted by the delay unit 206 from UHD to HD the same as that of the output SDR video signal.

A combination unit 208 being a processor including a circuit such as FPGA and ASIC, for example, obtains an SDR video signal for display by combining the display signal for displaying the predetermined signal level region with the output SDR video signal obtained by the SDR camera process unit 203 on the basis of the signal indicating the predetermined signal level region subjected to the resolution conversion by the resolution conversion unit 207. In this case, a part corresponding to the predetermined signal level region of the output SDR video signal is replaced with the display signal displaying in a specific color or a specific luminance pattern (zebra pattern, cross-hatched pattern and the like). Although not illustrated, the display signal is generated in the combination unit 208, for example.

Thereafter, the combination unit 208 outputs the SDR video signal for display to the display device capable of displaying the SDR video signal. By combining the display signal with the SDR video signal in this manner, it is possible to easily check the predetermined signal level region of the SDR video signal on the SDR screen displayed on the SDR-compliant display device. The SDR-compliant display device may be, for example, an LCD, an OLED, or a view finder.

Meanwhile, although an example of detecting the predetermined signal level region from the luminance signal forming the linear HDR video signal is described above, it is also possible to detect a predetermined signal level region from a luminance signal forming the HDR video signal after the processing such as the gradation compression is performed by the HDR camera process unit 202.

In this case, as indicated by a broken line, a level detection unit 205' is provided on a subsequent stage of the HDR camera process unit 202. Then, in the level detection unit 205', a predetermined signal level region is detected from a luminance signal forming the output HDR video signal output from the HDR camera process unit 202, and a signal indicating the predetermined signal level region is output. Then, the signal indicating the predetermined signal level region is supplied to the combination unit 208 to be used after the resolution thereof is converted from the UHD resolution to the HD resolution by the resolution conversion unit 207.

Furthermore, although an example in which the resolution of the HDR video signal is UHD is illustrated above, in a case where the resolution of the HDR video signal is HD, the resolution conversion units 204 and 207 which convert the resolution from UHD to HD are not required.

Also, an example of combining the display signal for displaying the predetermined signal level region with the SDR video signal is described above; however, the display signal for displaying the predetermined signal level region may also be combined with the HDR video signal. In this case, a signal level detection signal indicating the predetermined signal level region output from the level detection unit 205 or the level detection unit 205' is supplied to a combination unit 209 indicated by a broken line.

Then, the combination unit 209 combines the display signal for displaying the predetermined signal level region with the output HDR video signal obtained by the HDR camera process unit 202 on the basis of the signal indicating the predetermined signal level region to obtain the HDR video signal for display. Thereafter, the combination unit 209 outputs the HDR video signal for display to the display device capable of displaying the HDR video signal (for example, a display capable of performing high-luminance display). The HDR-compliant display device may be, for example, an LCD or an OLED. By combining the display signal with the HDR video signal in this manner, it is possible to easily check the predetermined signal level region of the HDR video signal on an HDR screen displayed on an HDR-compliant display device.

As described above, in the camera system 10 illustrated in FIG. 1, in the BPU 200, the predetermined signal level region is detected from the luminance signal forming the HDR video signal, and the display signal for displaying the predetermined signal level region is combined with the SDR video signal on the basis of the signal indicating the predetermined signal level region. Therefore, the predetermined signal level region of the luminance signal in the HDR video signal may be easily checked on the SDR screen displayed on the SDR-compliant display device.

Figure 4:
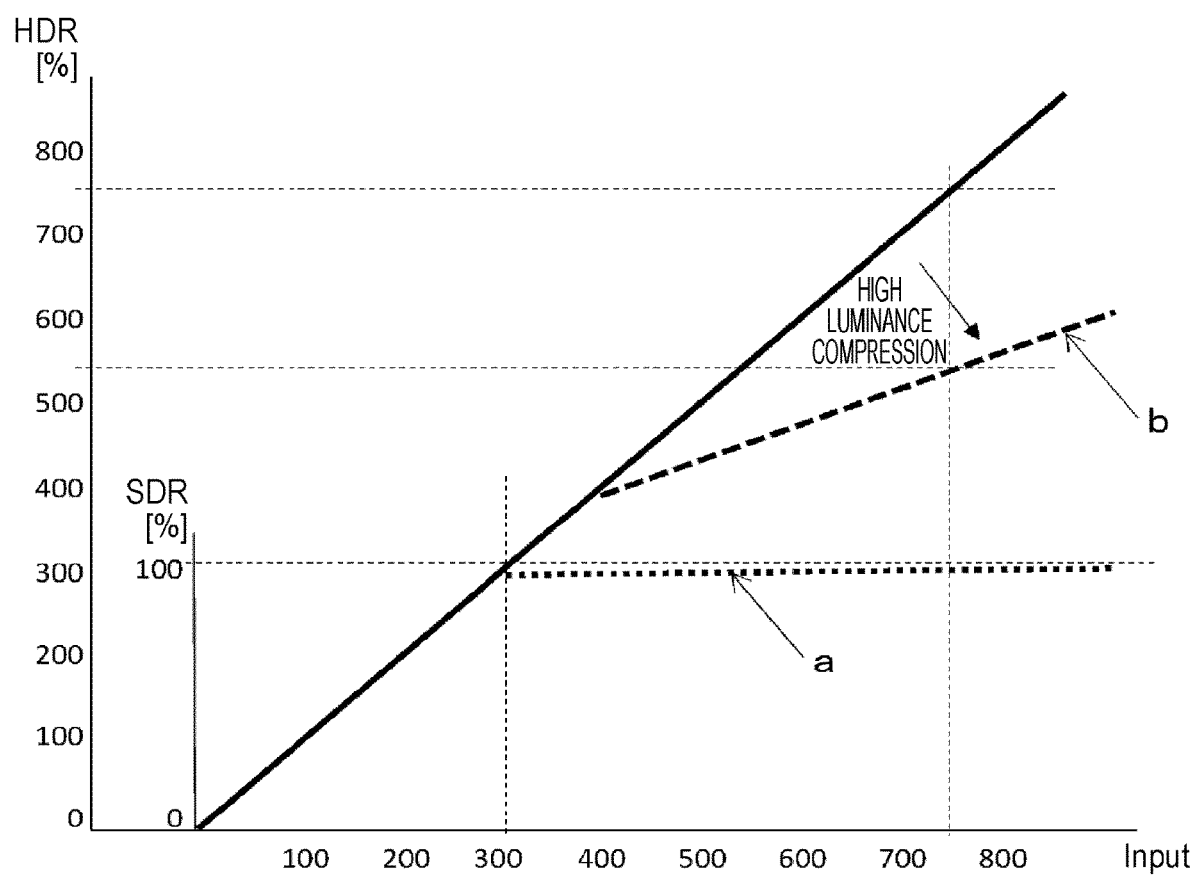

In this case, since the predetermined signal level region is detected from the luminance signal forming the HDR video signal, the level detection units 205 and 205' may correctly detect a region of a high luminance level exceeding a luminance level of the SDR video signal in the HDR video signal. In the SDR video signal, a high luminance level portion in the HDR video signal is compressed by the knee processing to be 100% or lower as indicated by arrow a in FIG. 4, so that it is not possible to correctly detect the region of the high luminance level in the HDR video signal (for example, a region of 750% or higher) from the SDR video signal.

Also, in a case of detecting the predetermined signal level region from the luminance signal forming the linear HDR video signal, it is possible to more easily detect the signal level region as compared to a case where the predetermined signal level region is detected from the luminance signal forming the output HDR video signal obtained by the HDR camera process unit 202. For example, when a high-luminance suppressing function is applied by the HDR camera process unit 202 as indicated by arrow b in FIG. 4, in a case of detecting the predetermined signal level region (for example, the region of 750% or higher) from the output HDR video signal obtained by the HDR camera process unit 202, it is necessary to change a detection level according to a suppression amount. However, in a case of detecting the predetermined signal level region from the linear HDR video signal, such change is not required.

Also, in a case where the resolution of the HDR video signal is UHD, the resolution of the signal indicating the predetermined signal level region obtained by the level detection units 205 and 205' is converted from UHD to HD to be used by the combination unit 208. Therefore, even in a case where the resolution of the HDR video signal is UHD and the resolution of the SDR-compliant display device is HD, the predetermined signal level region of the luminance signal in the HDR video signal may be easily checked on the SDR screen displayed on the SDR-compliant display device.

2. Second Embodiment

[Configuration Example of Camera System]

In the first embodiment described above, an example is illustrated in which the linear HDR video signal is transmitted from the camera 100 to the BPU 200 and the BPU 200 combines the display signal displaying the predetermined signal level region of the video signal in the HDR video signal with the SDR video signal under the supply of the linear HDR video signal. However, even in a case where an HDR video signal already subjected to gradation compression processing is supplied, similar processing may be performed.

Figure 5:
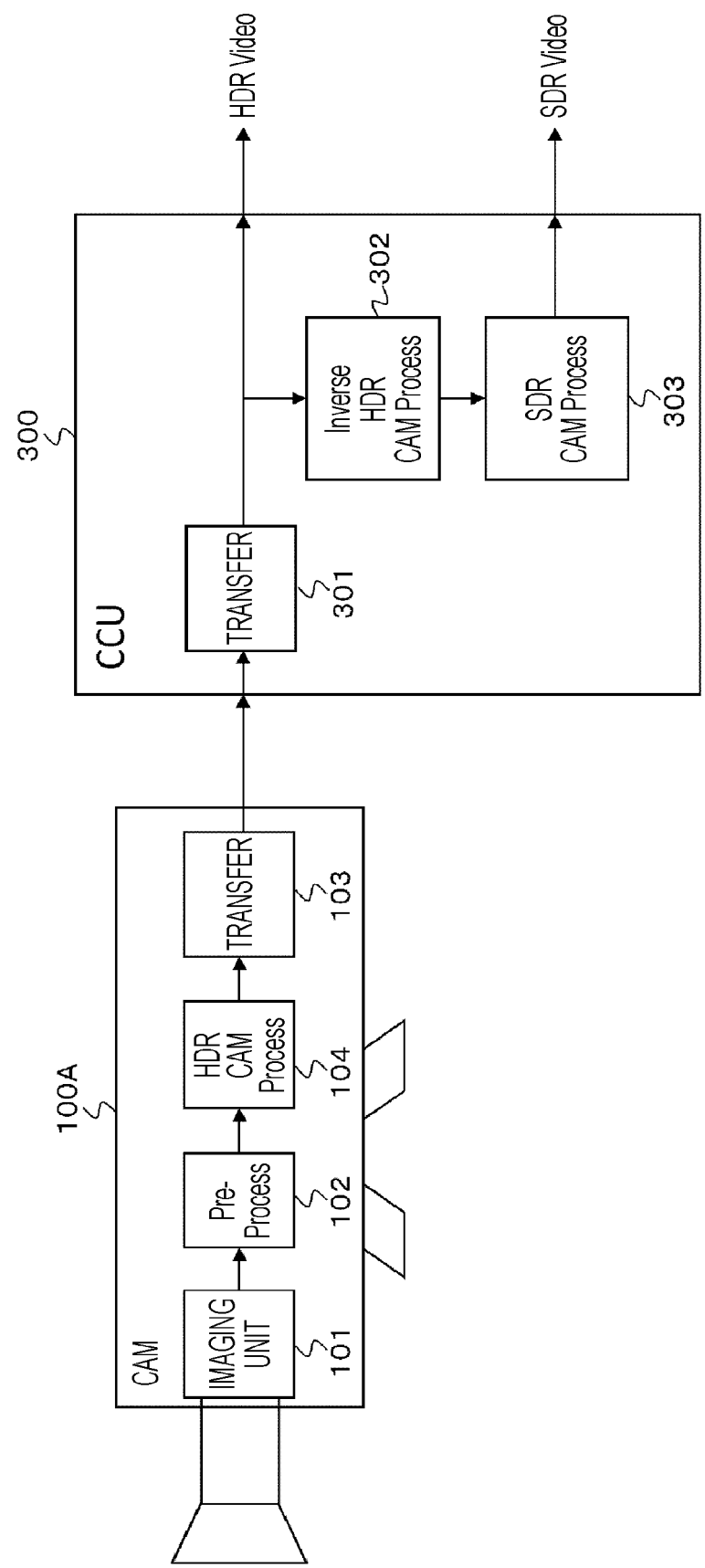
FIG. 5 is a block diagram illustrating a configuration example of a camera system as a second embodiment.

FIG. 5 illustrates a configuration example of a camera system 10A as a second embodiment. In FIG. 5, a part corresponding to that in FIG. 1 is assigned with the same reference sign, and the detailed description thereof is appropriately omitted. The camera system 10A is configured such that the HDR video signal subjected to the gradation compression processing as a captured video signal obtained by a camera 100A is transmitted to a camera control unit (CCU) 300.

The camera 100A includes an imaging unit 101, a pre-process unit 102, an HDR camera process (HDR CAM Process) unit 104, and a transmission unit 103. The imaging unit 101 includes, for example, a 4K or HD image sensor, and outputs the HDR video signal as the captured video signal. The pre-process unit 102 is a processor including a circuit such as FPGA and ASIC, for example, and performs correction processing of an optical system such as a lens, correction processing of a damage caused by variation in image sensors and the like on the HDR video signal output from the imaging unit 101, and the like.

The HDR camera process unit 104 performs processing such as color gamut conversion, detail (contour) correction, and gradation compression on the HDR video signal processed by the pre-process unit 102. The HDR camera process unit 104 is a processor including a circuit such as FPGA and ASIC, for example, and although it is not described in detail, this has a configuration similar to that of the HDR camera process unit 202 in the BPU 200 of the camera system 10 described above (refer to FIGS. 1 and 2). The transmission unit 103 is a circuit including a communication interface and transmits the HDR video signal processed by the HDR camera process unit 104 to a CCU 300.

The CCU 300 includes a transmission unit 301, an inverse HDR camera process (Inverse HDR CAM Process) unit 302, and an SDR camera process (SDR CAM Process) unit 303. The transmission unit 301 is a circuit including a communication interface, and receives the HDR video signal transmitted from the camera 100A. The HDR video signal directly becomes an output HDR video signal from the CCU 300.

The inverse HDR camera process unit 302 is a processor including a circuit such as FPGA and ASIC, for example, and performs processing such as conversion from a Y chrominance domain to an RGB domain and inverted conversion of gradation compression on the HDR video signal received by the transmission unit 301 to obtain a linear HDR video signal. The SDR camera process unit 303 is a processor including a circuit such as FPGA and ASIC, for example, and performs processing such as color gamut conversion, knee correction, detail (contour) correction, and gradation compression on the linear HDR video signal received by the inverse HDR camera process unit 302 to obtain an output SDR video signal (SDR Video).

Figure 6:
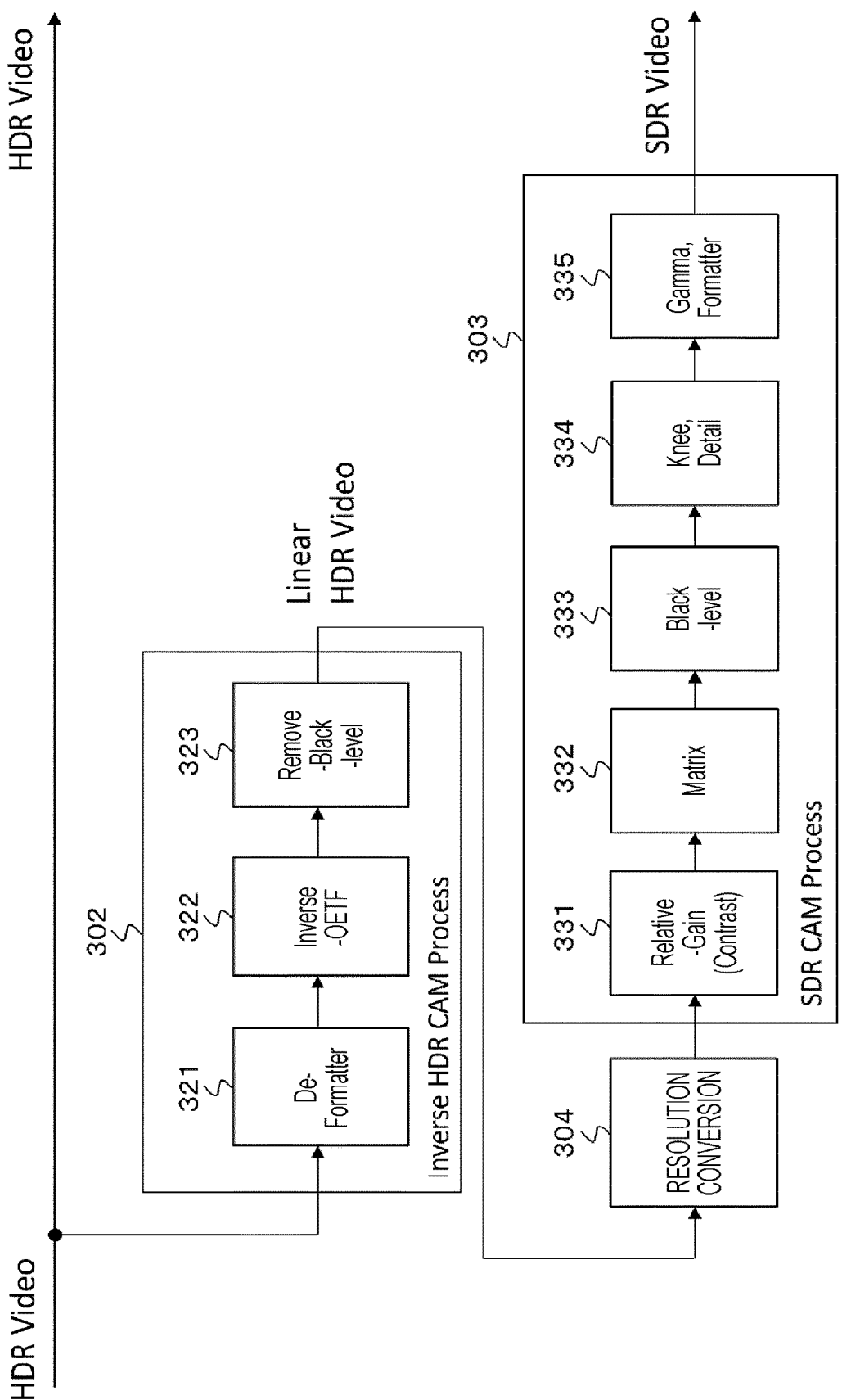
FIG. 6 is a block diagram illustrating a detailed configuration example of an inverse HDR camera process unit and an SDR camera process unit.

FIG. 6 illustrates a detailed configuration example of the inverse HDR camera process unit 302 and the SDR camera process unit 303. Meanwhile, this example is an example in which the HDR video signal has UHD (8K, 4K and the like) resolution, and a resolution conversion unit 304 which converts the resolution of the HDR video signal from UHD to HD is provided on a preceding stage of the SDR camera process unit 303. The resolution conversion unit 304 is a processor including a circuit such as FPGA and ASIC, for example.

The inverse HDR camera process unit 302 includes a de-formatter unit 321, an inverse-OETF unit 322, and a remove-black-level unit 323.

The de-formatter unit 321 performs the conversion processing from the Y chrominance domain to the RGB domain on the HDR video signal received by the transmission unit 301 (refer to FIG. 5). The inverse-OETF unit 322 performs the inverted conversion of the gradation compression on the HDR video signal output from the de-formatter unit 321 to obtain the linear HDR video signal. The remove-black-level unit 323 returns a black level of the linear HDR video signal output from the inverse-OETF unit 322 to a state before being adjusted by a black-level unit of the HDR camera process unit 104 (refer to FIG. 5).

The SDR camera process unit 303 includes a relative-gain unit 331, a linear-matrix unit 332, a black-level unit 333, a knee/detail unit 334, and a gamma/formatter unit 335.

The relative-gain unit 331 performs gain adjustment for contrast adjustment on the linear HDR video signal (Linear HDR Video) output from the inverse HDR camera process unit 302 the resolution of which is converted to the HD resolution by the resolution conversion unit 304. The linear-matrix unit 332 performs the color gamut conversion processing on the HDR video signal output from the relative-gain unit 331.

The black-level unit 333 adjusts a black level of the HDR video signal output from the linear-matrix unit 332. The knee/detail unit 334 performs the knee correction on the HDR video signal output from the black-level unit 333 to obtain an SDR video signal and further performs the detail (contour) correction on the SDR video signal.

The gamma/formatter unit 335 performs the gradation compression processing of compressing a bit length from a linear region by using an optical-electro transfer function (gamma characteristic) for SDR on a linear SDR video signal output from the knee/detail unit 334. Also, the gamma/formatter unit 335 converts the SDR video signal subjected to the gradation compression in this manner from the RGB domain to the Y chrominance domain to obtain the output SDR video signal (SDR Video).

In this embodiment, the CCU 300 may detect a predetermined signal level region from a luminance signal in the HDR video signal, and combine a display signal for displaying the predetermined signal level region with the SDR video signal on the basis of a signal indicating the predetermined signal level region. By combining the display signal with the SDR video signal in this manner, it is possible to easily check the predetermined signal level region of the luminance signal in the HDR video signal on an SDR screen displayed on an SDR-compliant display device.

Figure 7:
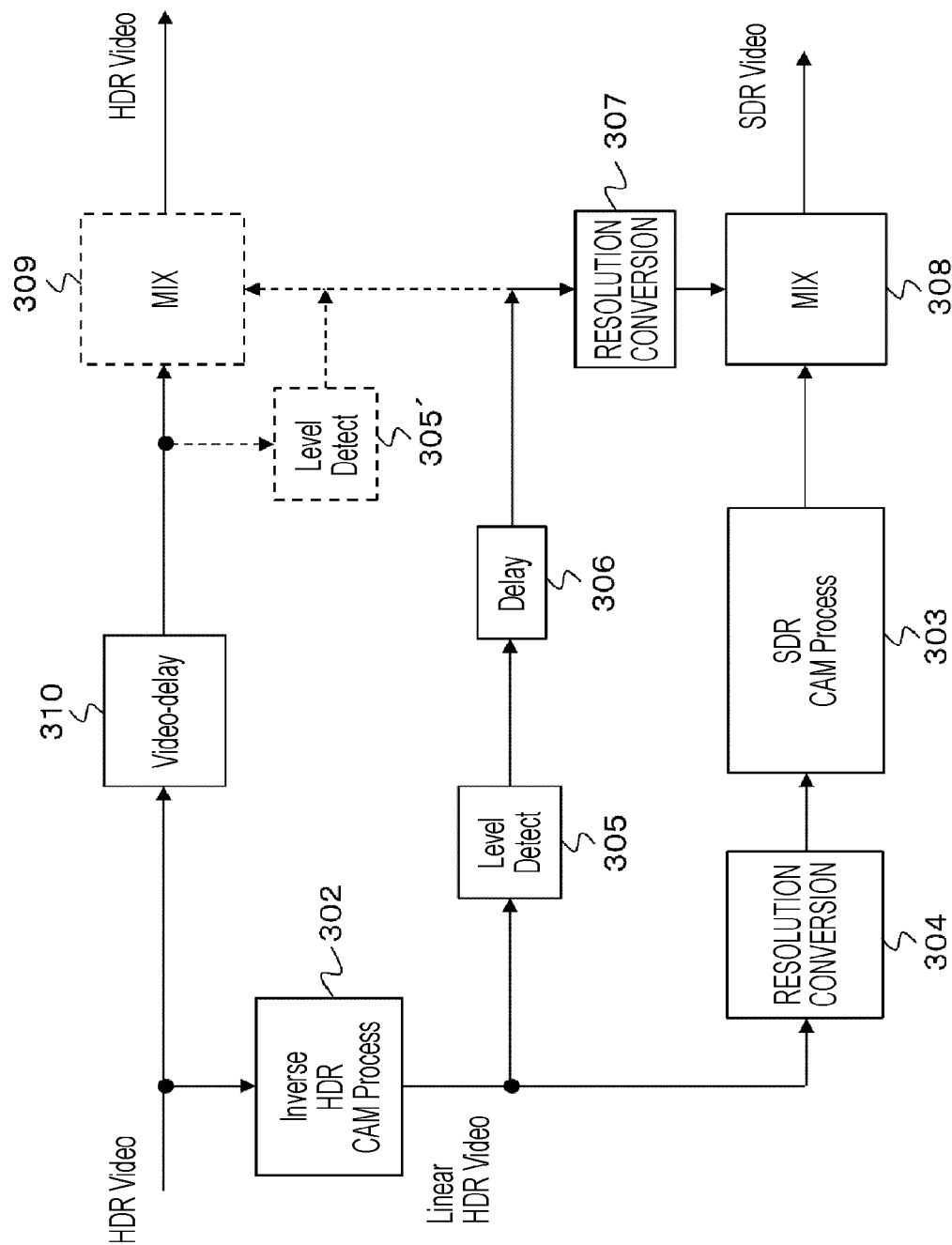
FIG. 7 is a block diagram illustrating a configuration example of a portion regarding generation and combination of a display signal in a CCU.

FIG. 7 illustrates a configuration example of a portion regarding generation and composition of the display signal in the CCU 300. In FIG. 7, parts corresponding to those in FIGS. 5 and 6 are assigned with the same reference signs. A level detection (Level Detect) unit 305 being a processor including a circuit such as FPGA and ASIC, for example, detects a predetermined signal level region from a luminance signal forming the linear HDR video signal (Linear HDR Video) output from the inverse HDR camera process unit 302 and outputs a signal indicating the predetermined signal level region.

The signal indicating the predetermined signal level region is the signal which becomes "1" in a detection region and "0" in other regions corresponding to each pixel signal, for example, and has the same resolution as that of the HDR video signal, herein, the UHD (8K, 4K and the like) resolution. Meanwhile, the predetermined signal level may be specified by a user from, for example, a user operation unit not illustrated. For example, the signal level is specified as "A % to B %", "C % or higher" and the like.

A delay unit 306 being a processor including a circuit such as FPGA and ASIC, for example, is provided for aligning a timing of the signal indicating the predetermined signal level region obtained by the level detection unit 305 to that of the output SDR video signal (SDR Video) obtained by the SDR camera process unit 303. A resolution conversion unit 307 being a processor including a circuit such as FPGA and ASIC, for example, converts resolution of the signal indicating the predetermined signal level region the timing of which is adjusted by the delay unit 306 from UHD to HD the same as that of the output SDR video signal.

A combination unit 308 being a processor including a circuit such as FPGA and ASIC, for example, obtains an SDR video signal for display by combining the display signal for displaying the predetermined signal level region with the output SDR video signal obtained by the SDR camera process unit 303 on the basis of the signal indicating the predetermined signal level region subjected to the resolution conversion by the resolution conversion unit 307. In this case, a part corresponding to the predetermined signal level region of the output SDR video signal is replaced with the display signal displaying in a specific color or a specific luminance pattern (zebra pattern, cross-hatched pattern and the like). Although not illustrated, the display signal is generated in the combination unit 308, for example.

Thereafter, the combination unit 308 outputs the SDR video signal for display to the display device capable of displaying the SDR video signal. By combining the display signal with the SDR video signal in this manner, it is possible to easily check the predetermined signal level region of the SDR video signal on the SDR screen displayed on the SDR-compliant display device. The SDR-compliant display device may be, for example, an LCD, an OLED, or a view finder.

Meanwhile, although an example of detecting the predetermined signal level region from the luminance signal forming the linear HDR video signal is described above, it is also possible to detect a predetermined signal level region from a luminance signal forming the HDR video signal on which the processing such as the gradation compression is performed received by the transmission unit 301 (refer to FIG. 5).

In that case, as indicated by a broken line, a predetermined signal level region is detected by a level detection (Level Detect) unit 305' from a luminance signal forming the HDR video signal a timing of which is adjusted by a video-delay unit 310 and a signal indicating the predetermined signal level region is output. Then, a signal indicating the predetermined signal level region is supplied to the combination unit 308 to be used after the resolution thereof is converted from the UHD resolution to the HD resolution by the resolution conversion unit 307. Meanwhile, the video-delay unit 310 is a processor including a circuit such as FPGA and ASIC, for example.

Furthermore, although an example in which the resolution of the HDR video signal is UHD is described above, in a case where the resolution of the HDR video signal is HD, the resolution conversion units 304 and 307 which convert the resolution from UHD to HD are not required.

Also, an example of combining the display signal for displaying the predetermined signal level region with the SDR video signal is described above; however, the display signal for displaying the predetermined signal level region may also be combined with the HDR video signal. In this case, the signal indicating the predetermined signal level region detected by the level detection unit 305 or the level detection unit 305' is supplied to a combination unit 309 indicated by a broken line.

Then, the combination unit 309 combines the display signal for displaying the predetermined signal level region with the HDR video signal a timing of which is adjusted by the video-delay unit 310 on the basis of the signal indicating the predetermined signal level region to obtain the HDR video signal for display. Thereafter, the combination unit 309 outputs the HDR video signal for display to the display device capable of displaying the HDR video signal (for example, a display capable of performing high-luminance display). The HDR-compliant display device may be, for example, an LCD or an OLED. By combining the display signal with the HDR video signal in this manner, it is possible to easily check the predetermined signal level region of the HDR video signal on an HDR screen displayed on an HDR-compliant display device.

As described above, in the camera system 10 illustrated in FIG. 5, in the CCU 300, the predetermined signal level region is detected from the luminance signal forming the HDR video signal, and the display signal for displaying the predetermined signal level region is combined with the SDR video signal on the basis of the signal indicating the predetermined signal level region. Therefore, as in the first embodiment described above, the predetermined signal level region of the luminance signal in the HDR video signal may be easily checked on the SDR screen displayed on the SDR-compliant display device.

In this case, since the predetermined signal level region is detected from the luminance signal forming the HDR video signal, the level detection units 305 and 305' may correctly detect a region of a high luminance level exceeding a luminance level of the SDR video signal in the HDR video signal. Also, in a case of detecting the predetermined signal level region from the luminance signal forming the linear HDR video signal, it is also possible to more easily detect the signal level region as compared to a case where the predetermined signal level region is detected from the luminance signal forming the output HDR video signal subjected to the gradation compression and the like.

Also, in a case where the resolution of the HDR video signal is UHD, the resolution of the detection region signal obtained by the level detection units 305 and 305' is converted from UHD to HD to be used in the combination unit 308. Therefore, even in a case where the resolution of the HDR video signal is UHD and the resolution of the SDR-compliant display device is HD, the predetermined signal level region of the luminance signal in the HDR video signal may be easily checked on the SDR screen displayed on the SDR-compliant display device.

3. Variation

Meanwhile, in the above-described embodiments, an example in which the predetermined signal level region is detected from the luminance signal forming the HDR video signal by the level detection unit is described. However, it is also possible that the level detection unit detects a predetermined signal level region from each of primary color signals of R, G, and B forming the HDR video signal and a display signal indicating each detection region is combined with an output SDR video signal or an output HDR video signal. In this case, the predetermined signal level region of each of the primary color signals of R, G, and B may be easily checked on the SDR screen or on the HDR screen.

The present technology may also have the following configurations.

(1) A signal processing device provided with:
a signal processing unit which obtains a standard dynamic range video signal by performing processing including at least gradation compression processing for a standard dynamic range on a high dynamic range video signal;
a level detection unit which detects a predetermined signal level region from the high dynamic range video signal; and
a combination unit which combines a display signal for displaying the predetermined signal level region with the standard dynamic range video signal on the basis of a signal indicating the predetermined signal level region detected from the high dynamic range video signal to obtain a standard dynamic range video signal for display.

(2) The signal processing device according to (1) described above,
with the high dynamic range video signal having first resolution,
the device further provided with:
a first resolution conversion unit which converts resolution of the high dynamic range video signal from the first resolution to second resolution lower than the first resolution; and
a second resolution conversion unit which converts resolution of the signal indicating the predetermined signal level region from the first resolution to the second resolution,
in which the signal processing unit
processes the high dynamic range video signal converted to the second resolution to obtain the standard dynamic range video signal of the second resolution, and
the combination unit combines the display signal for displaying the predetermined signal level detection region with the standard dynamic range video signal of the second resolution on the basis of the signal indicating the predetermined signal level region converted to the second resolution to obtain the standard dynamic range video signal for display of the second resolution.

(3) The signal processing device according to (2) described above,
in which the first resolution is 4K or 8K, and the second resolution is HD.

(4) The signal processing device according to any one of (1) to (3) described above, in which the level detection unit detects the predetermined signal level region from a luminance signal forming the high dynamic range video signal.

(5) The signal processing device according to any one of (1) to (3) described above,
in which the level detection unit detects the predetermined signal level region from a primary color signal forming the high dynamic range video signal.

(6) The signal processing device according to any one of (1) to (5) described above,
in which the combination unit outputs the standard dynamic range video signal for display to a display device for displaying the predetermined signal level region.

(7) A signal processing method provided with:
a signal processing step of obtaining a standard dynamic range video signal by performing processing including at least gradation compression processing for a standard dynamic range on a high dynamic range video signal;
a level detecting step of detecting a predetermined signal level region from the high dynamic range video signal; and
a combining step of combining a display signal for displaying the predetermined signal level region with the standard dynamic range video signal on the basis of a signal indicating the predetermined signal level region detected from the high dynamic range video signal to obtain a standard dynamic range video signal for display.

(8) A camera system provided with:
an imaging unit which obtains a high dynamic range video signal;
a signal processing unit which obtains a standard dynamic range video signal by performing processing including at least gradation compression processing for a standard dynamic range on the high dynamic range video signal;
a level detection unit which detects a predetermined signal level region from the high dynamic range video signal; and
a combination unit which combines a display signal for displaying the predetermined signal level region with the standard dynamic range video signal on the basis of a signal indicating the predetermined signal level region detected from the high dynamic range video signal to obtain a standard dynamic range video signal for display.

REFERENCE SIGNS LIST 10, 10A Camera system
100, 100A Camera
101 Imaging unit
102 Pre-process unit
103 Transmission unit
104 HDR camera process unit
200 Baseband processor unit (BPU)
201 Transmission unit
202 HDR camera process unit
203 SDR camera process unit
204, 207 Resolution conversion unit
205, 205' Level detection unit
206 Delay unit
208, 209 Combination unit
221 White-gain unit
222 Linear-matrix unit
223 Black-level unit
224 Detail unit
225 OETF/formatter unit
231 White-gain/relative-gain unit
232 Linear-matrix unit
233 Black-level unit
234 Knee/detail unit
235 Gamma/formatter unit
300 Camera control unit (CCU)
301 Transmission unit
302 Inverse HDR camera process unit
303 SDR camera process unit
304, 307 Resolution conversion unit
305, 305' Level detection unit
306 Delay unit
308, 309 Combination unit
310 Video-delay unit
321 De-formatter unit
322 Inverse-OETF unit
323 Remove-black-level unit
331 Relative-gain unit
332 Linear-matrix unit
333 Black-level unit
334 Knee/detail unit
335 Gamma/formatter unit

The invention claimed is:
1. A signal processing device comprising:
a signal processing unit which obtains a standard dynamic range video signal by performing processing including at least gradation compression processing for a standard dynamic range on a high dynamic range video signal;
a level detection unit which detects a predetermined signal level region from the high dynamic range video signal; and
a combination unit which combines a display signal for displaying the predetermined signal level region with the standard dynamic range video signal on the basis of a signal indicating the predetermined signal level region detected from the high dynamic range video signal to obtain a standard dynamic range video signal for display.

2. The signal processing device according to claim 1, with the high dynamic range video signal having first resolution,
the device further comprising:
a first resolution conversion unit which converts resolution of the high dynamic range video signal from the first resolution to second resolution lower than the first resolution; and
a second resolution conversion unit which converts resolution of the signal indicating the predetermined signal level region from the first resolution to the second resolution,
wherein the signal processing unit
processes the high dynamic range video signal converted to the second resolution to obtain the standard dynamic range video signal of the second resolution, and
the combination unit
combines the display signal for displaying the predetermined signal level region with the standard dynamic range video signal of the second resolution on the basis of the signal indicating the predetermined signal level region converted to the second resolution to obtain the standard dynamic range video signal for display of the second resolution.

3. The signal processing device according to claim 2, wherein the first resolution is 4K or 8K, and the second resolution is HD.

4. The signal processing device according to claim 1, wherein the level detection unit detects the predetermined signal level region from a luminance signal forming the high dynamic range video signal.

5. The signal processing device according to claim 1, wherein the level detection unit detects the predetermined signal level region from a primary color signal forming the high dynamic range video signal.

6. The signal processing device according to claim 1, wherein the combination unit outputs the standard dynamic range video signal for display to a display device for displaying the predetermined signal level region.

7. A signal processing method comprising:
a signal processing step of obtaining a standard dynamic range video signal by performing processing including at least gradation compression processing for a standard dynamic range on a high dynamic range video signal;
a level detecting step of detecting a predetermined signal level region from the high dynamic range video signal; and
a combining step of combining a display signal for displaying the predetermined signal level region with the standard dynamic range video signal on the basis of a signal indicating the predetermined signal level region detected from the high dynamic range video signal to obtain a standard dynamic range video signal for display.

8. A camera system comprising:
an imaging unit which obtains a high dynamic range video signal;
a signal processing unit which obtains a standard dynamic range video signal by performing processing including at least gradation compression processing for a standard dynamic range on the high dynamic range video signal;
a level detection unit which detects a predetermined signal level region from the high dynamic range video signal; and
a combination unit which combines a display signal for displaying the predetermined signal level region with the standard dynamic range video signal on the basis of a signal indicating the predetermined signal level region detected from the high dynamic range video signal to obtain a standard dynamic range video signal for display.

* * * * *